Feb. 20, 1962 A. D. L. HUTCHINSON 3,022,111
MOVABLE BODY ON A TRUCK FRAME
Filed Oct. 27, 1959 3 Sheets-Sheet 1
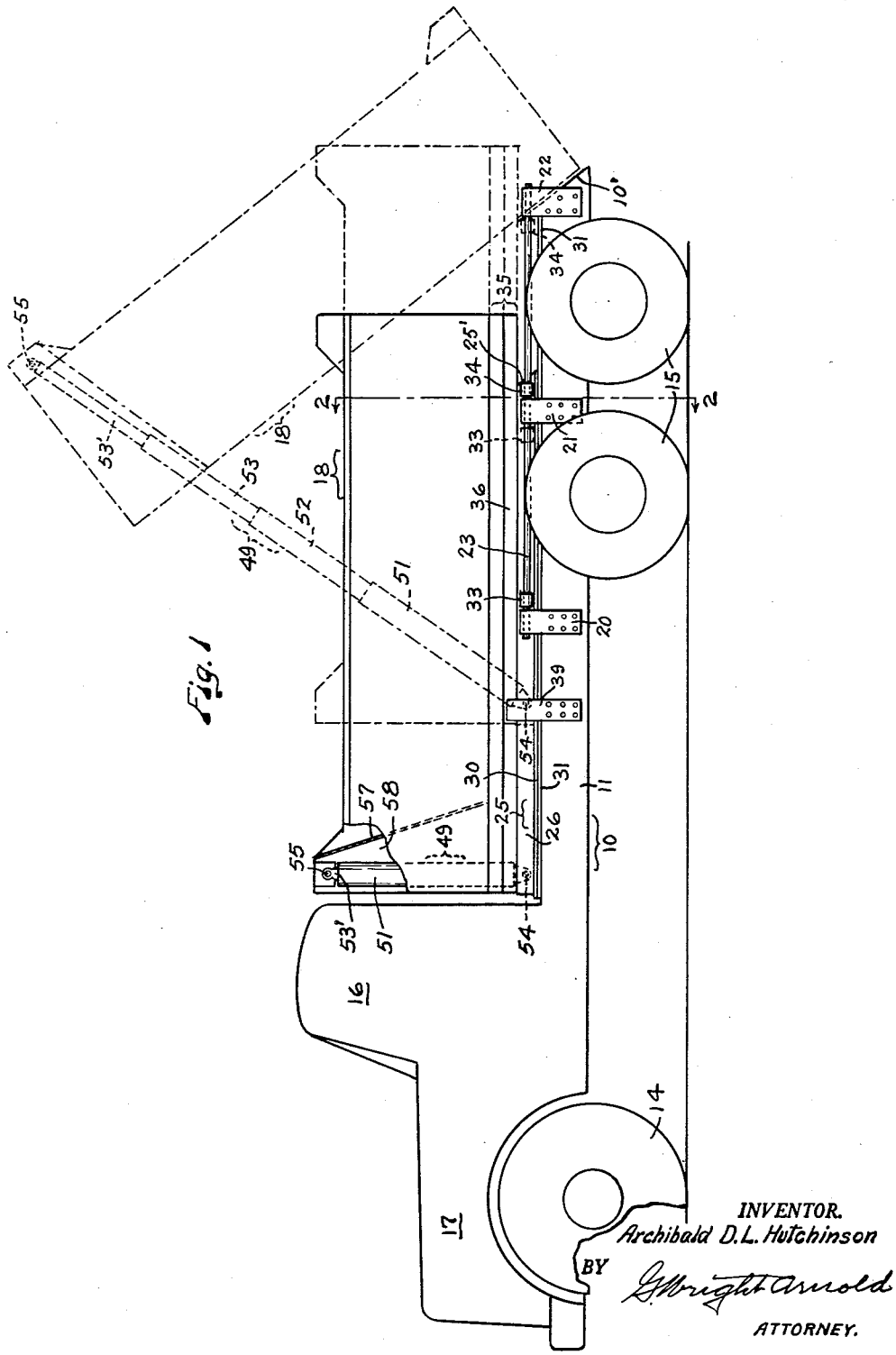
INVENTOR.
Archibald D. L. Hutchinson
BY
ATTORNEY.

Feb. 20, 1962  A. D. L. HUTCHINSON  3,022,111
MOVABLE BODY ON A TRUCK FRAME
Filed Oct. 27, 1959  3 Sheets-Sheet 2
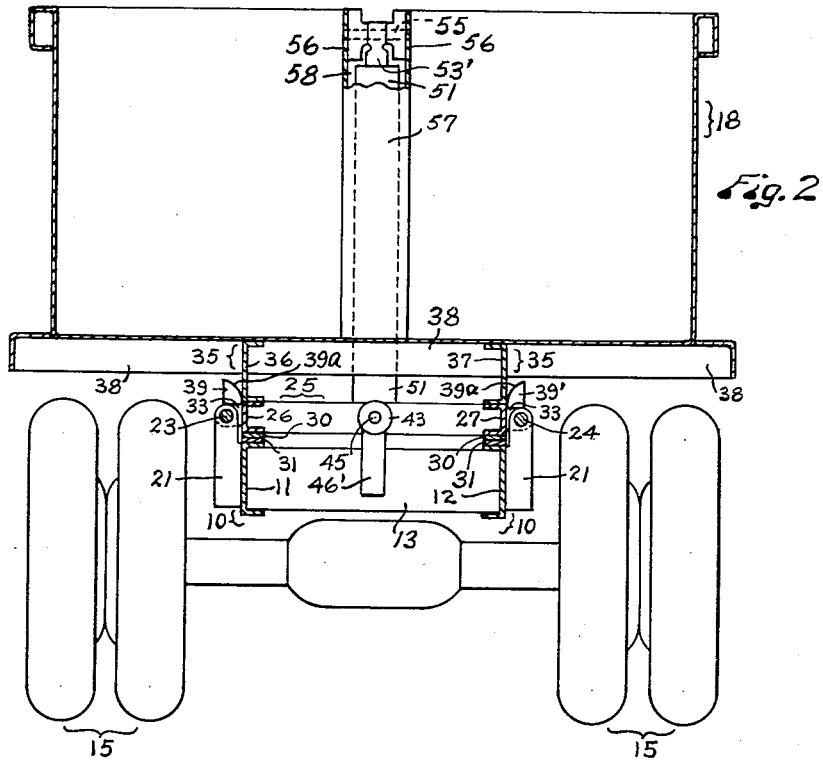
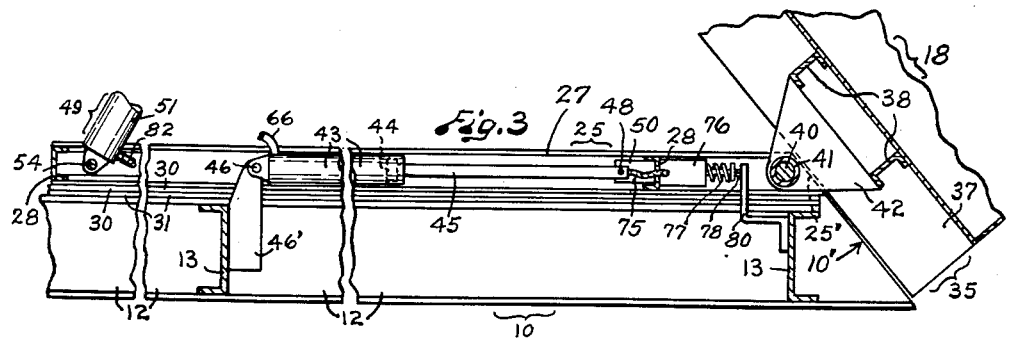
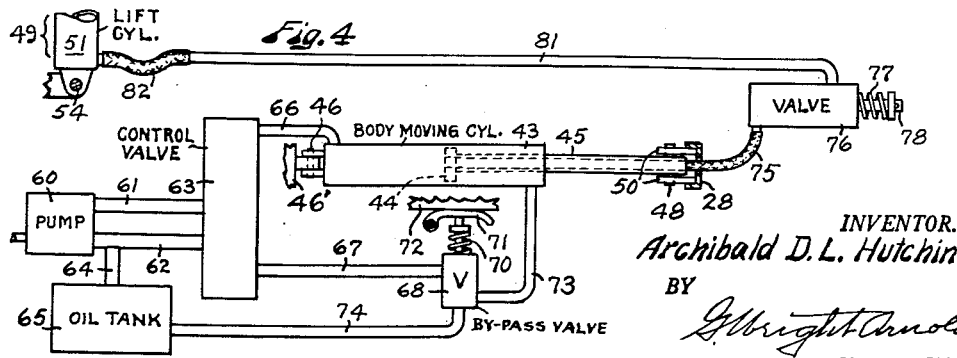
INVENTOR.
Archibald D. L. Hutchinson
BY
*G. Wright Arnold*
ATTORNEY Feb. 20, 1962  A. D. L. HUTCHINSON  3,022,111
MOVABLE BODY ON A TRUCK FRAME
Filed Oct. 27, 1959  3 Sheets-Sheet 3
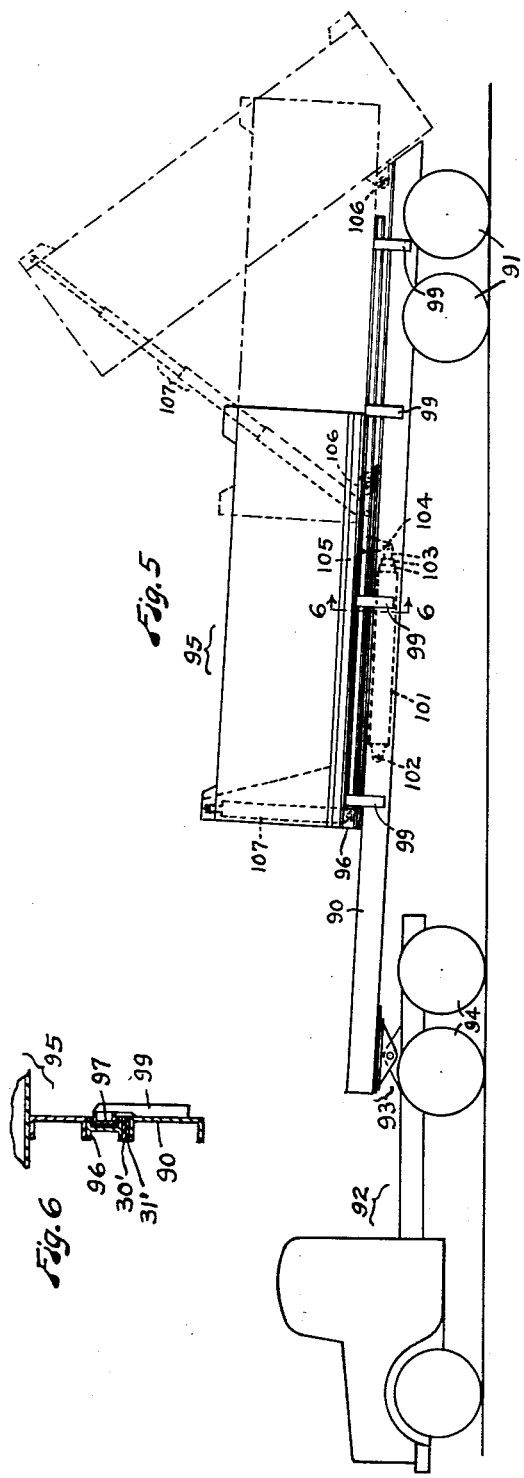
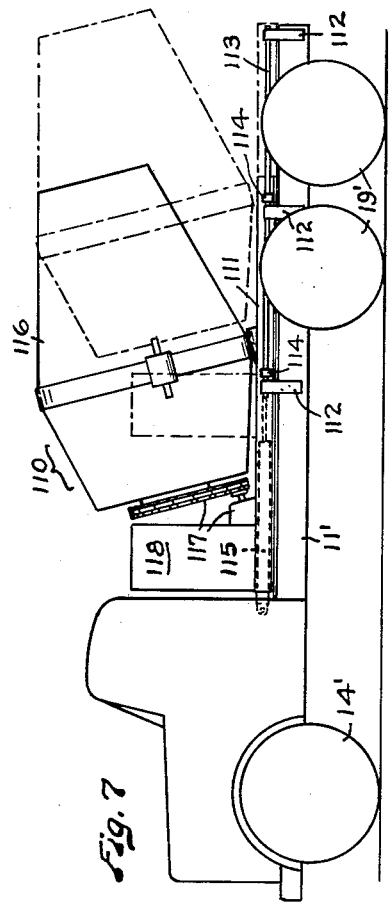
INVENTOR.
Archibald D.L. Hutchinson
BY 3,022,111
MOVABLE BODY ON A TRUCK FRAME
Archibald D. L. Hutchinson, 2616 Franklin Ave.,
Seattle, Wash.
Filed Oct. 27, 1959, Ser. No. 849,051
10 Claims. (Cl. 298—14)

My invention relates to a power-operated mechanism adapted to actuate in horizontal longitudinal movement a body mounted on a standard truck frame. Particularly does my invention relate to such power-operated mechanism for trucks of the dump truck type; that is, the body is subject to movement both horizontally longiturinally and also to dumping position.

More particularly, my invention relates to a power-operated mechanism adapted to actuate in horizontal longitudinal movement the body on a standard truck frame in order to comply with road load laws, to obtain the maximum load permitted by said laws, and to provide increased traction over soft ground where the load laws do not apply.

For purposes of clearness and definiteness of illustration, my invention and discovery will be described as applied to a standard dump type truck. However, the invention is not limited to said dump type, but is also applicable to the nondump type of standard truck body.

An objection to attempted solutions of this problem heretofore is that the actuating mechanism for moving the body backwardly and forwardly of the dump truck body is not wholly located above the frame of the truck. This leads to difficulties in installing and providing the necessary extent of movement of the body on a standard truck frame. The longitudinally and vertically moving parts for actuating the body into dumping position introduce great difficulties in providing room for installing the same on standard truck bodies. One obstruction encountered in such construction is the transverse bracing members of the truck frame. A primary object of my invention is not only to overcome such difficulties but also to provide apparatus which moves the body longitudinally above the truck frame and to make it adaptable to standard bodies of standard truck frame construction.

The basis of the load law resides in and arises from providing for the safety of a load on a bridge and also upon the area of contact of the tire with road surfaces elsewhere. For illustration: A bridge load is an engineered matter for certain length of span and distribution of weight. If the truck concentrates too much load in one short area for a given wheel base, for example, then the bridge is endangered, so that the load, to satisfy safety requirements, must be distributed over a calculated length or span, requiring a greater wheel base length. Accordingly, my invention provides for the distribution of the load between the front and rear wheels of a truck. This same principle applies to protecting the road bed. At the same time the truck may have to proceed over soft ground to reach its destination, for instance, new construction. Then, if too much load is present on the front wheels, which have no tractive effort, they will be mired and the traction on the rear wheels often becomes inadequate to make the front wheels plow through the soft ground. Accordingly, an object of my invention is to be able to move the load longitudinally and horizontally rearwardly to increase the load on the tractive wheels at the rear and to lighten the load on the front wheels so that they will not be mired. By so shifting the load and increasing the tractive force, the truck is enabled to reach its destination.

Thus, there are occasions when the load must be placed on the rear wheels where the tractive effort is exerted, and this load would be contrary to load regulations. Thus, the truck must be ready to meet both off-the-road conditions and road load conditions on the highway. Accordingly, it is an object of my invention to provide power-actuated means capable of moving the body of the truck rearwardly or forwardly as required to obtain the necessary or desired load distribution. To illustrate the application of the highway load laws, the following is set forth:

Assuming the truck involved is a three-axle truck. The law, for the State of Washington (the law differs in different States), is that the distance from the front axle to the rearmost axle is a minimum of 19 feet. The gross load permitted by the road load laws in said State is 47,000 pounds, based upon the bridge formula. No more of said gross load than 32,000 pounds may be put on the rear axle bogie unit. Thus, a minimum of 15,000 pounds must be placed on the front axle. Yet this situation does not provide the necessary traction for moving over soft ground.

In order to accomplish such a loading, it is necessary to use much shorter bodies than at present in use on standard motor trucks. In so loading, the trucks will be found to be in immobile condition when soft ground is encountered, as will be the case under many off-the-highway situations. The short-length body will bring the center of gravity of the load forward to the point where the front axle will get its proportion of the load that is necessary to obtain this heavy loading and so satisfy road load regulations. This in turn will bring the plane of the rear of the body into a position forward of the rearmost section of the rearmost tire, or forwardly of the rear end of the truck frame.

My invention provides for increased load hauling and yet complies fully with road load laws. The problem, then, is how to get the maximum load and at the same time comply with the load laws.

A further requirement for moving the body longitudinally of the truck frame arises when a dumping operation is required which permits the load to be dumped and clear the rear wheels and the frame. My object is to be able to comply with the load laws when moving over the highway and to be able to empty the load at a required point or into a hopper of a concrete mixer or a box or other container rearwardly of the rear wheels or of the chassis frame.

Thus, the object of my invention is three-fold: (1) to provide a body movable longitudinally of the frame of a standard truck; (2) to move the load longitudinally to permit increase of traction effort on the rear traction wheels when operating over soft ground; and (3) to be able to dump the load at a point or into a container rearwardly of the truck chassis.

My invention may be in general described as overcoming prior art structures as follows: Such devices have not been designed to load up the front axle to the maximum permitted by present-day load laws. It is to be understood of course that the structure of my device will be changed to meet different load laws, but its fundamental principle will remain. In short, the object of my invention is to comply with the present load laws and at the same time provide the full load for the truck, so that the operator may have the maximum income from his investment in each load hauled. At the same time it is my object to provide a truck of a character which will enable the said truck to move over soft ground.

A further primary object of my invention is to make it possible for the operator to control the movement of the body longitudinally from mechanism in the cab while the truck is traveling.

Objections to prior art trucks of dumping character are that they provide for a truck body to move backwardly while being tilted and then, reaching a position where gravity takes hold, the truck body is dumped downwardly, so that it is out of control of the operator from the cab. In other words, he could not control the dumping angle of the body and there would then be a tendency for the entire load of material to dump all at once.

A further objection to many of the prior art devices of this character is that a truck body may go to the ground, or so low that it would be impossible to dump the load into a concrete hopper, for illustration. The hopper must be located beneath the truck body when the body is in its tipped position; that is, it must be beneath the lower end about which the truck body is oscillating or revolving, so as to leave room for the load to move and dump into the hopper. The hopper then lifts the concrete mix and dumps it into a concrete mixer.

By "standard truck chassis" is meant that the truck chassis comes as made at the factory, for all uses to which the truck may be put. Applicant must adapt his invention to this standard truck chassis. Some prior art devices do not provide for stability for the truck body while dumping. If the load is unequally distributed, the body will tend to twist out of position. In other words, there must be the element of stability. Applicant provides this stability by hinging one end of the truck body to a longitudinally movable sub-frame which is securely held down on and restrained against transverse movement relative to the truck frame.

The standard truck chassis comes with cross-members and radius rods which must be undisturbed, in large part, and the equipment made for dumping the truck, providing stability, etc., must not disturb these bracing members, the drive parts, etc.

The purpose of the construction heretofore for moving the body backwardly or rearwardly is to take advantage of gravity to cause the body to dump, whereas applicant does not make use of rearward movement for any such purpose. He uses power to cause the truck body to dump and may move the body rearwardly without any elevating of the body toward dumping position. This permits him to use the rearward movement for adjusting the load to the rear wheels or to the front wheels for load distribution in obtaining traction where it is necessary. For instance, going into soft ground, it would be important to have as little weight as possible on the front wheels and to have the traction-producing rear wheels heavily loaded. With the construction of applicant, the load can be moved to provide the additional traction necessary on soft ground.

Aside from all these purposes and incidental advantages, there is this advantage and the primary purpose for the rearwardly moving truck body. That reason is, if you have a distance of 17 feet from front to rear axle, the road law permits a gross load of 44,459 pounds. No more than 32,000 pounds may be put on the bogie unit of the truck chassis. 16 feet 6 inches is considered 17 feet; anything less is considered 16 feet. The approximate front axle weight is 6,000 pounds. We have to get 6,459 pounds additional at the front. The law does not allow more than 32,000 pounds on the rear wheels while on the highway. The only other place the load can be put is up front. The law is based upon the so-called "bridge formula."

The object of my invention is to provide a mechanism which satisfies the road load and at the same time provides for carrying the maximum load in order that the maximum earning power of the truck may be obtained.

Other objects, features and advantages of the invention will become apparent as the following description is read in conjunction with the accompanying drawings, wherein:

FIGURE 1 is a side elevation of a truck having a longitudinaly movable truck body and operating means therefor constructed in accordance with my invention, parts being broken away and certain positions into which the body may be moved being shown by dot-dash lines;

FIG. 2 is a view partly in section and partly in elevation taken substantially on broken line 2—2 of FIG. 1 and on a larger scale than FIG. 1;

FIG. 3 is a fragmentary view, partly in elevation and partly in section, showing pivot means for the truck body and mounting means for hydraulic cylinders used in moving the truck body;

FIG. 4 is a hydraulic diagram showing the hydraulic operating and control means used in moving the truck body;

FIG. 5 is a side elevational view showing a semi-trailer having a longitudinally movable dump body made in accordance with my invention, certain positions into which the body may be moved being shown in dot-dash lines;

FIG. 6 is a sectional view taken substantially on broken line 6—6 of FIG. 5 and on a larger scale than FIG. 5; and FIG. 7 is a somewhat diagrammatic side elevation illustrating an embodiment of my invention in which a non-dumping type load, illustrated as a concrete mixer, is longitudinally movably mounted on a truck frame.

The truck shown in the drawings is of conventional form. It comprises a truck frame 10 formed in part by two parallel spaced-apart side bars 11 and 12 and cross bars 13. The frame 10 is supported on front wheels 14 and rear wheels 15 and has the usual cab 16 and engine housing or compartment 17. A truck body 18 is mounted on the truck frame 10 for longitudinal and tilting movement in accordance with my invention.

One practical means for movably mounting the truck body 18 on the truck frame 10 is herein disclosed by way of illustration, but obviously the mounting means can be varied. The mounting herein disclosed comprises securing to the outer side of each truck frame channel bar 11 and 12 preferably three spaced-apart upright bracket members 20, 21 and 22, each of which extends above the top plane of the truck frame. The upper end portions of the bracket members 20, 21 and 22, which are carried by the channel bar 11, support a longitudinally extending horizontal track bar or rod 23. The corresponding brackets, which are carried by the other channel bar 12, support a similar longitudinally extending horizontal track bar 24. The two track bars 23 and 24 are rigid relative to the truck frame 10 and are positioned in a common plane above and parallel to the top plane of said truck frame 10.

A rectangular sub-frame 25, composed in part of two spaced-apart parallel channel-shaped side bars 26 and 27 and cross bars 28, is supported on the truck frame 10. A side plate 31 is fixedly secured to the upper edge of each truck frame side bar 11 and 12. A similar slide plate 30 is rigidly secured to the lower edge or flange of each sub-frame side bar 26 and 27. Each upper slide plate 30 is supported on and adapted to slide on the slide plate 31 at its side of the truck frame 10. Two longitudinally spaced-apart slide brackets 33 and 34 are secured to the outer side of each sub-frame side bar 26 and 27 and fit slidably over the adjacent track bar 23 or 24. Thus, the sub-frame 25 is held down on and restrained against transverse movement relative to the truck frame 10. At the same time the sub-frame 25 is freely longitudinally movable on the truck frame 10 a limited distance.

The truck body 18 has a truck body-supporting frame 35, including two parallel spaced-apart channel bars 36 and 37 which rest on the respective sub-frame side bars 26 and 27 when said truck body is in a lowered or horizontal position. The channel bars 36 and 37 have cross bars 38 secured thereto. Two guide and positioning members 39 and 39', FIGS. 1 and 2, are rigidly secured to the respective truck frame members 11 and 12 forwardly of the brackets 20 and extend upwardly along side the sub-frame members 26 and 27 and truck body members 36 and 37, to properly position the sub-frame 25 and truck body 18 and to prevent undesirable sidewise movement of the front end portions of the sub-frame 25 and truck body 18. Preferably, the inner faces of the guide members 39 and 39' are beveled, as shown at 39a, FIG. 2, to guide the body 18 into its lowering movement.

The rear end portion of the truck body 18 is pivotally connected with the sub-frame 25 in such a manner that the truck body may be tiltingly raised into the dumping position in which said body 18 is shown by dot-dash lines in FIG. 1. One pivotal mounting means for said truck body 18 is shown in FIG. 3. It comprises a transverse pivot rod 40 secured to the rear end portion of the sub-frame 25, a sleeve 41 rotatably on said pivot rod 40 and bracket plates 42 welded or otherwise rigidly secured to cross bars 38 of the truck body supporting frame. The rear end of the sub-frame 25 and the rear end of the truck frame 10 are beveled, as indicated by numerals 25' and 10', respectively, in FIGS. 1 and 3, to provide clearance for the rear end portion of the truck body supporting frame 35 when said frame is in dumping position.

The sub-frame 25 and truck body 18 are moved longitudinally of the truck frame 10 by a double-acting hydraulic body moving cylinder or jack 43 having therein a reciprocable piston 44 connected with a tubular piston rod 45. One end of the hydraulic cylinder 43 is connected by a pivot member 46 and bracket 46' with a rigid cross bar 13 of the truck frame 10. The outer end of the tubular piston rod 45 is connected by pins 48 and bracket 50 with a cross bar 28 of the sub-frame 25.

The means for lifting and tilting the truck body 18 to dump a load comprises a multiple part lift cylinder or jack, referred to generally by numeral 49, which is formed of a plurality of relatively telescopic parts 51, 52, 53 and 53' shown by dot-dash lines in FIG. 1. The lowermost end of the lift cylinder 49 is connected by a pivot member 54 with a cross bar 28 which is part of the forward end portion of the sub-frame 25. The uppermost end of the lift cylinder 49 is connected by a pivot member 55 with the upper ends of two spaced-apart side plates 56 which are a fixed part of the truck body. The plates 56 cooperate with a rear wall 57, which extends across and connects said plates, in forming a well 58 in the front end portion of the truck body 18. The well 58 receives and provides clearance for the lift cylinder 49.

From the foregoing description it will be seen that all parts of my device which are movable vertically or horizontally relative to the truck frame are mounted above the top plane of said truck bed. This insures clearance for all vertically and horizontally movable parts and greatly facilitates application of my invention to truck chassis of conventional construction.

The hydraulic control devices for controlling the supply of liquid, such as oil under pressure, to the body-moving cylinder 43 and lift cylinder 49, comprise a driven pump 60 connected by a high pressure conduit 61 and a low pressure conduit 62 with a distributing or control valve 63. The control valve 63 is operated by the driver from the cab 16 of the truck. The low pressure conduit 62 is connected by a conduit 64 with an oil tank or reservoir 65. The control valve 63 is connected by one conduit 66 with the forward end of the body-moving cylinder 43 and by another conduit 67 with a by-pass valve 68. The by-pass valve 68 is yieldingly urged closed by a spring 70 and is held open, when the truck body is in a lowered and nondumping position, by the depression of a shoe 71 which is positioned for engagement by a part 72 of the truck body frame 35. The shoe 71 is interposed between the valve 68 and truck body frame part 72, because said part 72 is longitudinally movable with the truck body and will slide easily over said shoe. The by-pass valve 68 is connected by one conduit 73 with the rear end portion of the body-moving cylinder 43 and by another conduit 74 with the oil tank 65.

The rear end of the tubular piston rod 45 is connected by a conduit 75 with a lift cylinder control valve 76. The valve 76 is carried on the sub-frame 25. Said valve 76 is yieldingly urged closed by a spring 77 on a stem 78 and is adapted to be opened by engagement of said stem 78 with a fixed valve-operating member 80, FIG. 3, when the sub-frame 25 and body 18, in moving rearwardly, reach the limit of their rearward movement. The valve-operating member 80 is supported from the truck frame 10. Supplying oil under pressure to the valve 76 through the tubular piston 45 simplifies construction and obviates the necessity for a long hose connection to the valve 76, because said valve 76, being mounted on the sub-frame 25, moves synchronously with the piston 45. The conduit 75 can be a hose, but this is not essential. The valve 76 is connected by a conduit 81 with the lower end portion of the body lift cylinder 49. Preferably a short piece of flexible hose 82 is interposed in the conduit 81 to facilitate the tilting movement of the lift cylinder 49, but no long hose is needed in this instance, because the lift cylinder 49 is attached to and moves with the sub-frame 25.

The operation of the hydraulic devices just described is as follows: The control valve 63 has three positions, hereinafter termed neutral position, raising position and lowering position, for said valve. In the raising position the control valve 63 controls both the rearward and the raising movement of the truck body 18 through connection with cylinders 43 and 49. In its lowering position said control valve 63 controls both the lowering and the forward movement of the truck body 18. The by-pass valve 68 cooperates with the control valve 63 in both the raising and the lowering positions of said control valve.

In the neutral position of the control valve 63 the high pressure conduit 61 is connected with the low pressure conduit 62 and all ports to conduits 66 and 67 are closed. Thus, when valve 63 is in neutral, oil can circulate freely from the high pressure to the low pressure side of the pump 60 and to the tank 65 but cannot enter or exhaust from either end of the body-moving cylinder 43 and the truck body is held immovable.

In the raising position of the control valve 63 the high pressure conduit 61 is connected by way of valve 63 and conduit 66 with the forward end of the body-moving cylinder 43, and if the truck body is horizontal and in engagement with the by-pass valve 68, the low pressure conduit 62 is connected by way of valve 63, conduit 67, valve 68 and conduit 73 with the rear end portion of the body-moving cylinder 43. With the body-raising connections thus established and with the truck bed in any fully lowered position, high pressure oil entering the cylinder 43 by way of conduit 66 will begin to move the truck body 18 rearwardly with low pressure oil exhausting from cylinder 43 by way of conduit 73, valve 68, conduit 67, valve 63 and conduit 62. This rearward movement can be stopped at any time by moving the control valve 63 to a neutral position, or it can be reversed at any time by moving said valve 63 to a raising position. If the rearward movement continues until the truck body reaches its rearmost position (horizontal), as shown by dot-dash lines in FIG. 1, the valve 76 will be opened due to valve stem 78 contacting the relatively fixed valve-operating member 80 just before rearward movement is stopped. High pressure oil will then be supplied to the tilt cylinder 49 by way of conduit 61, valve 63, conduit 66, cylinder 43, tubular piston rod 45, conduit 75, valve 76, and conduits 81 and 82. This will begin to tiltingly raise the truck body 18. As soon as the truck body 18 begins its upward tilting movement, it will release by-pass valve 68 and the spring 70 will close said valve 68 relative to conduit 73. This will help to prevent longitudinal movement of the truck body 18 as long as said truck body is in a tilted position.

Upward tilting movement of the truck body can be stopped at any time by moving valve 63 to the neutral position, or it can be reversed by moving said valve 63 to the lowering position. If the control valve 63 remains in the raising position, the lift cylinder 49 will lift the truck body 18 to full dumping position, as shown by dot-dash lines in FIG. 1, where it can be held by moving the control valve 63 to the neutral position or lowered by moving said valve 63 to lowering position. With the control valve 63 in the lowering position, the forward end of the body-moving cylinder 43 is connected, for exhaust purposes, by way of conduit 66 and said valve 63 with the low pressure conduit 62. Also, a flow passageway is established from high pressure conduit 61 through valve 63, conduit 67, by-pass valve 68 and by-pass conduit 74 back to tank 65, but the passageway through by-pass valve 68 to conduit 73 remains closed until the truck body reaches a fully lowered position and operates said by-pass valve 68.

If the truck body 18 is in any raised position and the control valve 63 is set in a lowering position, oil will exhaust from the lift cylinder 49 through conduit 81, valve 76, conduit 75, tubular piston rod 45, cylinder 43, conduit 66 and valve 63 to the low pressure conduit 62. The by-pass valve 68 will always be closed as respects conduit 73, when the truck body 18 is in any raised position, and will always help to prevent longitudinal movement of said truck body when said truck body is raised. When the truck body 18 reaches a maximum lowered position, it will operate by-pass valve 68 to disconnect by-pass conduit 74 as respects conduit 67 and to connect said conduit 67 with conduit 73. High pressure oil will then pass by way of conduit 61, control valve 63, conduit 67, by-pass valve 68 and conduit 73 to the rear end of body-moving cylinder 43 and will begin to move the truck body 18 forwardly. This forward movement can be stopped or reversed at any time, but if the control valve remains in the lowering position, the truck body 18 will be moved to its foremost position.

Using the tubular piston rod 45 as part of the oil conduit to the lift cylinder 49 obviates the use of a hose at least as long as the distance of longitudinal movement of the truck body to connect with the movable valve 76 and thus eliminates the problem of finding room for and taking care of and protecting a hose of this length on a truck where substantially all of the room underneath the truck body is already in use, making it difficult to find room for and take care of such a hose.

The cylinder 43 with tubular piston rod 45 and piston 44 is, in effect, a double-acting hydraulic power unit which forms part of a conduit, and this unit will operate in the same manner if it is reversed end for end as respects the showing in FIGS. 3 and 4. Also, it will be understood that other body-moving means can be used instead of this unit.

FIG. 5 illustrates an embodiment of my invention in a semi-trailer in such a manner as to provide for maximum load-carrying capacity under existing road laws and at the same time to provide a load-carrying structure which is practical for load-dumping purposes. Said FIG. 5 shows a relatively long semi-trailer frame 90 having its rear end portion supported on conventional dual wheels 91 and its front end portion supported on and connected with the rear end portion of a truck 92 by a conventional fifth wheel structure 93. The rear end portion of the truck 92 is supported on the usual dual wheels 94.

A dump body 95, short enough in length for practical dumping purposes but of fairly large load-carrying capacity, is supported for longitudinal and dumping movement on the semi-trailer frame 90. The means for mounting and supporting and longitudinally and angularly moving the body 95 on the semi-trailer frame 90 can be, and is herein shown to be, similar to the truck body-supporting and moving means shown in FIGS. 1 to 4 and hereinbefore described. However, some of the parts are differently proportioned and arranged to take care of a greater distance of longitudinal movement. Also, the construction and mounting of the sub-frame are different. The body-mounting and supporting and moving means shown in FIGS. 5 and 6 comprises a rectangular sub-frame 96, the two sides of which are similar. The side members of the sub-frame 96 are I-beams, as shown in FIG. 6. These I-beams are longitudinally movably supported on and guided by rigid track members 97. The track members 97 are positioned above and extend lengthwise of the trailer frame members 90 and are supported from said members 90 by upright brackets 99. Slide plates 30' and 31' are secured respectively to the sub-frame members 96 and the trailer frame members 90.

A horizontally disposed hydraulic cylinder 101, shown by dotted lines, and similar to cylinder 43, FIG. 4, has an end thereof connected by pivot 102 with the trailer frame 90 and has piston means 103 connected by a pivot 104 and bracket 105 with the sub-frame 96. The space between the two sides of the semi-trailer frame is usually unobstructed and the cylinder 101 can be positioned below the bottom plane of the sub-frame 96 to allow clearance for a fairly long distance of travel of said sub-frame 96 and the body 95. Pivot devices 106 and a lift cylinder assembly 107 are provided between the body 95 and sub-frame 96 and are similar to those previously described in connection with FIGS. 1 to 4. Hydraulic control and operating means similar to the previously described hydraulic control and operating means shown in FIGS. 3 and 4, can be used in connection with cylinders 101 and 107.

The semi-trailer body 95 shown in FIG. 5 operates similarly to the truck body 18, but usually has more longitudinal movement. The frame 90 can be made long to allow a great enough distance between the rear truck wheels 94 and the trailer wheels 91 so that a maximum legal load allowable on highways can be placed on each of said sets of wheels 91 and 94. When in use on the highways, the trailer body 95 usually will be positioned midway between the two sets of wheels 91 and 94 to evenly divide the load therebetween. However, said body 95 can be positioned nearer to the trailer wheels 91, if desired. Preferably, the body 95 is made short enough for practical dumping purposes, it being obvious that a long body would present problems in excess height and uncertain stability in dumping.

FIG. 7 illustrates a nondumping type of load supported for longitudinal movement on the frame 11' of a truck so that the weight of said load can be adjusted relative to the front wheels 14' and the rear wheels 19' of said truck. For illustrative purposes the load shown in FIG. 7 is a concrete mixer 110 mounted on a sub-frame 111, similar to sub-frame 25 of FIGS. 1, 2 and 3, by brackets 112, track rods 113 and slide members 114 of a type previously described. A double-acting hydraulic cylinder 115, controlled from the truck cab, can be used to impart longitudinal movement to the concrete mixer between a position shown by full lines, in which the load is partially on the front wheels 14', and the position shown by dot-dash lines, in which the major portion of the load is on the driven rear wheels 19'—a condition desirable in some instances when the truck is not on a highway but is on soft ground. The concrete mixer 110 herein illustrated comprises a rotary drum 116 connected by driving means 117 with a suitable motor 118 for driving the drum to mix concrete in transit.

The operation of the invention on trucks provides certain advantages in addition to providing for the body to be moved backwardly to have the load clear the wheels and truck parts in unloading or dumping. It may be important to have plenty of load on the rear wheels when off the highwya on soft ground. That may be obtained in the present invention by moving the body 18 and its load rearwardly over the rear wheels, thereby developing the required traction. Furthermore, it may be necessary or desirable to move the load back to free the weight on the front wheels 14 where there is no traction and where the ground is very rough and very soft. Thus, the moving back of the body 18 when loaded or unloaded may be of very great advantage in obtaining the proper traction, even though there is no dumping operation involved. Even on the highway, when empty, it may be advantageous to have more weight on the rear wheels 15 than is commonly provided when the body 18 is in forward position. In short, the body can be moved backwardly when not dumping, merely to gain weight and, therefore, traction on the rear wheels 15; or it may be moved back to lighten the load on the front wheels 14 when moving over soft ground.

While there has been described an embodiment of the invention, it is appreciated that changes may be made in the parts and their organization without departing from the inventive concept thereof. It is desired not to be limited to the particular embodiment illustrated, but to cover all modifications and arrangements which would be apparent to one skilled in the art and that come within the scope of the appended claims.

I claim:

1. A load-carrying dump truck comprising a truck frame; front and rear wheels supporting said truck frame; a sub-frame mounted for longitudinal movement on said truck frame; a truck body supported on said sub-frame and having its rear end portion pivotally connected with said sub-frame for dumping movement of said truck body; a double-acting hydraulic power unit including a cylinder having therein a tubular piston rod and piston providing therethrough a continuous passageway, one part of said double-acting power unit being attached to the truck frame and the other part thereof being attached to the sub-frame, whereby the sub-frame can be longitudinally moved relative to the truck frame; a hydraulic lift cylinder connected between and movable with said sub-frame and truck body; a conduit connecting said lift cylinder with the part of said double-acting power unit which is attached to the sub-frame; and a fluid pressure supply and exhaust conduit connected with the part of said double-acting power unit which is attached to said truck frame, whereby said cylinder and tubular piston rod and piston of said double-acting power unit cooperate in forming fluid pressure conduit means for said lift cylinder and the use of flexible hydraulic conduits on the truck frame is minimized.

2. A load-carrying dump truck comprising a truck frame; front and rear wheels supporting said truck frame; a sub-frame mounted for longitudinal movement on said frame; a truck body supported on said sub-frame and having its rear end portion pivotally connected with said sub-frame for dumping movement of said truck body; a double-acting hydraulic power unit including a cylinder having therein a tubular piston rod and piston providing therethrough a continuous passageway, one part of said double-acting power unit being attached to the truck frame and the other part thereof being attached to the sub-frame, whereby the sub-frame can be longitudinally moved relative to the truck frame; a hydraulic lift cylinder connected between and movable with said sub-frame and truck body; a conduit connecting said lift cylinder with the part of said double-acting power unit which is attached to the sub-frame; a normally closed valve in said conduit between said lift cylinder and said double-acting power unit; valve opening means positioned to open said valve when said sub-frame and truck body are in a dumping position at the rearmost limit of their travel; and a fluid pressure supply and exhaust conduit connected with the part of said double-acting power unit which is attached to said truck frame, the conduit through which fluid passes between said fluid pressure supply means and said lift cylinder being formed in part by the tubular piston rod and piston of said double-acting power unit.

3. A load-carrying dump truck comprising a truck frame; front and rear wheels supporting said truck frame; a sub-frame mounted for longitudinal movement on said truck frame; a truck body supported on said sub-frame and having its rear end portion pivotally connected with said sub-frame for dumping movement of said truck body; a double-acting hydraulic power unit including a cylinder having therein a tubular piston rod and piston providing therethrough a continuous passageway, one part of said double-acting power unit being attached to the truck frame and the other part thereof being attached to the sub-frame, whereby the sub-frame can be longitudinally moved relative to the truck frame; a hydraulic lift cylinder connected between and movable with said sub-frame and truck body; a conduit connecting said lift cylinder with the part of said double-acting power unit which is attached to the sub-frame; a normally closed valve in said conduit between said lift cylinder and said double-acting power unit; valve-opening means positioned to open said normally closed valve when said sub-frame and truck body are at the rearmost limit of their travel; fluid pressure supply means; a control valve connected with said fluid pressure supply means; and fluid pressure supply and exhaust means connecting said control valve with the part of said double-acting power unit which is attached to said truck frame, the conduit through which fluid passes between the control valve and the lift cylinder being formed in part by the cylinder and tubular piston rod and piston of said double-acting power unit.

4. A load-carrying dump truck comprising a truck frame; front and rear wheels supporting said truck frame; a sub-frame mounted for longitudinal movement on said truck frame; a truck body supported on said sub-frame and having its rear end portion pivotally connected with said sub-frame for dumping movement of said truck body; a double-acting hydraulic cylinder having a piston and a piston rod and connected between the truck frame and the sub-frame, whereby the sub-frame can be longitudinally moved relative to the truck frame; a hydraulic lift cylinder connected between and movable with said sub-frame and truck body; a main control valve communicatively connected with the end portion of said double-acting cylinder remote from the piston rod; a fluid pressure supply pump communicatively connected with said main control valve; a reserve tank communicating with said pump; a bypass valve communicatively connected between said tank and the end portion of said body-moving cylinder through which the piston rod extends; a spring yieldingly urging said by-pass valve closed; valve-opening means holding said by-pass valve open when said truck body is in a fully lowered position; a conduit connecting said main control valve with said lift cylinder; a lift cylinder control valve interposed in said conduit between said main control valve and said lift cylinder; a spring yieldingly holding said lift cylinder control valve closed; and valve-opening means holding said lift cylinder control valve open when said sub-frame is in a truck body dumping position.

5. A load transporting highway vehicle having a longitudinally extending and substantially horizontal frame structure with front and rear end supporting wheels, a load holding body mounted on said horizontal frame structure for limited longitudinal adjustment thereon between said wheels and travel limiting stops on said frame, and a fluid pressure medium control system operable to adjust said body on said frame to various positions between and against said limiting stops, said fluid pressure medium control system including therein a double acting hydraulic jack connected to said frame and to said body, a source of supply of fluid pressure medium with pressure transmitting connections to and from said double acting jack and a control valve interposed in said connections and manually operable to selectively control the application of fluid pressure medium from said source of supply to the jack to extend or contract said jack for moving the body forwardly or rearwardly and means to lock the body against movement from its forward or rearward positions of adjustment.

6. A combination according to claim 5 wherein said load holding body is pivotally mounted for load dumping, and a fluid pressure medium lift jack is mounted on said frame and is operable for effecting the dumping movements of said body; said jack having a pressure medium supply pipe leading thereto from said control system and a valve for controlling flow of fluid pressure medium in said supply pipe to and from the body dumping lift jack for the lifting and lowering of said dump body; said valve being normally closed and adapted to be automatically opened incident to the extending of said double acting hydraulic jack to such extent as to move the dump body against the rearward limiting stop.

7. A combination according to claim 6 including a sub-frame that is mounted for longitudinal movement on said frame structure and said load holding body is pivotally mounted on the rearward end of said sub-frame and the body lift jack is mounted on said sub-frame and has a lifting connection with a forward end portion of said dump body for its dumping and lowering action and wherein the controlling valve for the body dumping jack is mounted on and movable with the sub-frame and has an actuator stem positioned for its operative engagement with a fixed member of the truck frame for automatic valve opening incident to the extending of the double acting jack that shifts the sub-frame to its rearward limit of travel.

8. A vehicle comprising a substantially horizontal frame, front and rear wheels supporting said frame for highway travel, a sub-frame mounted for longitudinal movement on said horizontal frame, a body capable of receiving a load supported on said sub-frame and having pivotal mounting at its rear end on the sub-frame for dumping action, a horizontally disposed double acting hydraulic jack connected between the vehicle frame and sub-frame for longitudinally moving the sub-frame on the vehicle frame between its front and rear wheel supports, and a hydraulic lift jack connected between the forward portions of the sub-frame and dump body and operable for effecting the dumping and lowering movements of said body.

9. The apparatus as claimed in claim 8, in which the double-acting hydraulic cylinder is provided with a tubular piston rod and in which fluid pressure is supplied to and withdrawn from the hydraulic lift cylinder by conduit means formed in part by said tubular piston rod.

10. A load transporting highway vehicle having a longitudinally extending and substantially horizontal frame structure with front and rear end supporting wheels, a load holding body mounted on said horizontal frame structure for limited longitudinal adjustment therealong, a fluid pressure medium control system operable to adjust said body longitudinally on said frame structure; said fluid pressure medium control system including a double acting hydraulic jack interconnecting said frame and said body, a source of supply of fluid pressure medium with pressure transmitting connections to and from said double acting jack and a control valve for said connections operable to selectively control the application of fluid pressure medium from said source of supply to the jack to contract or extend it for moving the body forwardly or rearwardly and to lock it against movement from any position of its longitudinal adjustment, said load holding body being pivotally mounted on said frame for load dumping, and a lift jack mounted on said frame and movable therealong in accordance with the longitudinal adjustment of the body and operable for effecting the dumping action of said body.

References Cited in the file of this patent
UNITED STATES PATENTS

| | | |
|---|---|---|
| 1,319,118 | Rush et al. | Oct. 21, 1919 |
| 2,370,489 | Reed | Feb. 27, 1945 |
| 2,407,012 | Hutchinson | Sept. 3, 1946 |
| 2,739,837 | Sykes | Mar. 27, 1956 |
| 2,741,383 | Leckert | Apr. 10, 1956 |
| 2,815,980 | Harbers et al. | Dec. 10, 1957 |

FOREIGN PATENTS

| | | |
|---|---|---|
| 610,345 | France | June 5, 1926 |